US008832827B2

(12) United States Patent
Herscovitz et al.

(10) Patent No.: US 8,832,827 B2
(45) Date of Patent: Sep. 9, 2014

(54) SYSTEM AND METHOD FOR DETECTION AND RECOVERY OF MALFUNCTION IN MOBILE DEVICES

(75) Inventors: Eli Herscovitz, Kochav Yair (IL); Irit Rapaport, Givataim (IL)

(73) Assignee: Gryphonet Ltd., Tel Aviv (IL)

( * ) Notice: Subject to any disclaimer, the term of this patent is extended or adjusted under 35 U.S.C. 154(b) by 1601 days.

(21) Appl. No.: 11/988,730

(22) PCT Filed: Jul. 10, 2006

(86) PCT No.: PCT/IL2006/000797
§ 371 (c)(1),
(2), (4) Date: Jan. 14, 2008

(87) PCT Pub. No.: WO2007/007326
PCT Pub. Date: Jan. 18, 2007

(65) Prior Publication Data
US 2009/0125755 A1  May 14, 2009

Related U.S. Application Data

(60) Provisional application No. 60/698,939, filed on Jul. 14, 2005.

(51) Int. Cl.
*G06F 11/00* (2006.01)
*G08B 23/00* (2006.01)
*G06F 11/07* (2006.01)
*G06F 21/56* (2013.01)

(52) U.S. Cl.
CPC .......... *G06F 21/567* (2013.01); *G06F 11/0757* (2013.01)
USPC .......................................................... 726/22

(58) Field of Classification Search
CPC ..... G06F 21/566; G06F 21/564; G06F 21/56; G06F 21/562; G06F 21/565
USPC .......................................................... 726/22
See application file for complete search history.

(56) References Cited

U.S. PATENT DOCUMENTS

| 6,442,694 | B1 * | 8/2002 | Bergman et al. ................ 726/22 |
| 7,260,839 | B2 * | 8/2007 | Karasaki ......................... 726/11 |
| 7,707,620 | B2 * | 4/2010 | Cherepov .......................... 726/1 |
| 7,831,248 | B2 * | 11/2010 | Lee ................................. 455/423 |
| 7,975,300 | B2 * | 7/2011 | Kim et al. ....................... 726/23 |
| 2004/0039944 | A1 * | 2/2004 | Karasaki ........................ 713/201 |
| 2004/0153823 | A1 * | 8/2004 | Ansari ............................ 714/38 |
| 2006/0230312 | A1 * | 10/2006 | Nichols et al. ................. 714/25 |
| 2006/0253909 | A1 * | 11/2006 | Cherepov ....................... 726/26 |

* cited by examiner

*Primary Examiner* — Tamara T Kyle
(74) *Attorney, Agent, or Firm* — Merchant & Gould P.C.

(57) ABSTRACT

A method for recovering malfunction of at least one resource of a mobile device in response to a malware attack and a mobile device thereof. The method comprises diagnosing at least one malfunction of at least one resource of the mobile device without identifying a reason of the attack, and, in response to said diagnosing, recovering at least one resource of the mobile device. The mobile device comprises one or more resources operatively coupled to at least one sensor directly or indirectly coupled to a recovery block, wherein said sensor is configured to monitor at least one of said resources for information, possibly indicative of at least one affected resource, and to report, directly or indirectly this information and/or derivative thereof to the recovery block; and said recovery block is configured to initiate at least one recovery-related action in respect of at least one of said resources in case the received information and/or derivative thereof meets a certain criterion.

54 Claims, 9 Drawing Sheets

SYSTEM AND METHOD FOR DETECTION AND RECOVERY OF MALFUNCTION IN MOBILE DEVICES

FIELD OF THE INVENTION

This invention relates to mobile devices and, in particular, to methods and systems facilitating information security of mobile devices.

BACKGROUND OF THE INVENTION

Contemporary mobile devices (cellular phones, wireless and handheld computing devices, etc.) are changing from single function devices to integrated platforms that contain open operating systems (e.g Symbian OS™, Windows® CE, Mobile Linux) and combine voice, data and video. Furthermore, mobile devices are being opened to multiple communication channels (e.g. WiFi, Bluetooth, Cellular, etc.), which further exposes them to external manipulation. These radical changes present a whole set of new opportunities, but at the same time, increase dramatically the device vulnerability to security hacks (e.g. worms, viruses, Trojan Horses, blended threats or otherwise potentially malicious or suspicious software, including any program or file that is harmful to a device, referred to collectively hereinafter as "malware").

Communicating and messaging facilities of mobile devices may be used as the virus' transport media to infect other devices. Malicious code, once executed on a mobile device, can also use the phone log or phone address book to find new targets.

This problem has been recognized in Prior Art and various systems have been developed to provide a solution, for example:

U.S. Pat. No. 6,842,861 (Cox et al.) discloses a method and system for detecting viruses on handheld computers. The handheld computer is in communication with a computer system having a virus detection program. The method includes reading data from the handheld computer and writing the data at least temporarily to a database on the computer system. The data is scanned for viruses with the virus detection program. The method further includes updating data on the handheld computer based on results of the scanning.

US Patent Application No. 2003/084,321(Tarquini et al.) discloses a mobile device operable in a mobile telecommunications network comprising a memory module for storing data in machine readable format for retrieval and execution by a central processing unit and an operating system operable to execute an intrusion detection application stored in the memory module is provided. A node of a network for managing an intrusion detection system comprising a memory module for storing data in machine readable format for retrieval and execution by a central processing unit and an operating system comprising a network stack comprising a protocol driver and a media access control driver and operable to execute an intrusion protection system management application, the management application operable to receive text-file input defining a network-exploit rule and convert the text-file input into a signature file comprising machine-readable logic representative of an exploit-signature, the node operable to transmit the signature file to a mobile device over a radio frequency link is provided.

US Patent Application No. 2003/084,322 (Schertz et al.) discloses a computer comprising an operating system that controls the computer resources. An intrusion detection system is integrated with the operating system and operable to monitor the computer resources to detect, prevent and report intrusion attempts. An anti-virus system is further integrated with the operating system and operable to detect the presence of at least one virus in the computer resources.

US Patent Application No. 2003/135,749 and US Patent Application No. 2003/159,060 (both by Gales et al.) disclose a method of defining security conditions of a computer system for the purpose of detecting vulnerabilities. The method comprises the steps of specifying an attack representing a recognized vulnerability of the computer system, specifying at least one attribute of the specified attack, specifying at least one policy definition with respect to detecting the vulnerability of the specified attack, specifying at least one attribute of the specified policy definition, and specifying a remedy for the specified vulnerability.

US Patent Application No. 2003/162,575 (Morota et al.) discloses a cellular phone provided with a data transmitter, a detection result receiver and virus management information storage. The data transmitter transmits data to a virus detecting apparatus. The detection result receiver receives as virus management information a result of detection on whether the data transmitted by the data transmitter includes a computer virus. The virus management information storage stores the data and the virus management information about the data in association with each other.

US Patent Application No. 2003/200,460 (Morota et al.) discloses a system for detection of computer viruses in a portable telephone. The server device comprises a pattern data transmission request receiving unit which receives pattern data transmission requests that include the model name of the portable telephone, a pattern data extraction unit which extracts specified pattern data from a plurality of sets of pattern data on the basis of the model name of the portable telephone contained in the pattern data transmission requests received by the pattern data transmission request receiving unit, and a pattern data transmitting unit which transmits the specified pattern data extracted by the pattern data extraction unit to the portable telephone.

US Patent Application No. 2004/005,873 (Groenendaal et al.) discloses methods and systems for managing wireless devices in an enterprise. A first exemplary method manages the physical access points of a wireless network in an enterprise. A second exemplary method manages the assets of wireless devices in an enterprise. A third exemplary method enables virus detection within wireless devices. A fourth exemplary method manages wireless device data backup.

US Patent Application No. 2004/0127195 (An Ki Chul) discloses a mobile communication system and method for inactivating or curing mobile communication viruses. The system includes: a database associated with the mobile communication system, for storing at least one virus vaccine program; and a virus monitoring unit associated with the mobile communication system, for checking virus infection of received data, analyzing virus information, choosing one of virus vaccine programs that are stored in the database and inactivating the virus. Virus vaccine programs are timely updated over-the-air (OTA) whenever a new version of vaccine program is available.

US Patent Application No. 2004/172,551 (Fielding et al.) discloses a process of screening one or more software files to determine any that are recognized to have a matching hash signature with a file contained in a database of files known to be Virus, Trojan, Worm, or otherwise potentially malicious or suspicious element which can then be safely blocked, quarantined and/or deleted. This is accomplished through a method and apparatus running on a firewall, network device, mail server, server, personal computer, PDA, cell phone or wireless device to compare the hash signature of each incoming software file against a regularly updated database of known infected file hash signatures. One or more users can be alerted when an infected file is identified. If quarantined, the file is safely stored until virus software is updated properly with later developed virus definitions file(s), which are then used to eradicate or clean the infected file(s) or computer systems.

U.S. Patent Application No. 2004/209,608 (Kouznetsov et al.) discloses a system, method and computer program product for accessing security or content analysis functionality utilizing a mobile communication device. Included is an operating system installed on a mobile communication device capable of communicating via a wireless network. Further provided is an application program installed on the mobile communication device and executed utilizing the operating system for performing tasks. A scanning subsystem remains in communication with the application program via an application program interface. Such scanning subsystem is adapted for accessing security or content analysis functionality in conjunction with the tasks performed by the application program U.S. Patent Application No. 2004/268,145 (Watkins et al.) discloses an apparatus, system, method and computer program product for verifying the integrity of remote network devices that request access to network services and resources. Unintended computer programs such as viruses, worms, or Trojan Horses, may compromise remote devices. The invention involves downloading verification software over the web into the web browser of a client for the purpose of performing checks to verify the integrity and security of the client's device or system. The results of such checks are returned over the web to be used in security decisions involving authentication and the granting of authorization to access services and resources.

U.S. Patent Application No. 2005/064,859 (Kotzin et al.) discloses a system and method for backing up a memory of a wireless subscriber device. The method involves creating an archived representation of the memory image in a backup server and scanning modified representations of the memory image for abnormalities, such as viruses or other malicious files. If a problem has occurred, the memory of the wireless subscriber device can be restored using an archived representation of the memory image.

International Publication No. WO2003/012,643 (Pak et al.) discloses a system, method and computer program product for programmable scanning for malicious content on a wireless client device. Initially, an anti virus program having an instruction set, is assembled in a programmable computing language. The anti virus program is implemented on a wireless client device. A scan for malicious code is performed on the wireless client device utilizing the anti-virus program, including scanning a memory of the device as well as an inbound or outbound data stream traversing a communication port of the client device International Publication No. WO2003/012,644 (Kouznetsov et al.) discloses a scanning method in mobile devices, e.g. cellular phones, for viruses and other malware by updating malware scanners in the mobile devices over a wireless network using an application service provider.

International Publication No. WO2004/095,177 (Kouznetsov et al) discloses a platform-independent system and associated method for use with a mobile communication device. Included is a mobile communication device capable of communicating via a wireless network. Such mobile communication device includes an operating system installed thereon. Associated therewith is a platform-independent scanning subsystem in communication with the operating system of the mobile communication device for scanning purposes. Further provided is a platform-independent application program interface for interfacing the operating system and the scanning subsystem. The platform-independent application program interface includes an abstract library for porting the platform-independent scanning subsystem to the mobile communication device and associated operating system.

International Publication No. WO2005/022,441 (Liang et al.) discloses a network level virus monitoring system capable of monitoring a flow of network traffic in any of a number of inspection modes depending upon the particular needs of a system administrator. The system includes a network virus sensor self registration module coupled to a network virus/worm sensor arranged to automatically self register the associated network virus/worm sensor. The monitoring provides an early warning of a virus attack thereby facilitating quarantine procedures directed at containing a virus outbreak. By providing such an early warning, the network virus monitor reduces the number of computers ultimately affected by the virus attack resulting in a concomitant reduction in both the cost of repair to the system and the amount of downtime. In this way, the inventive network virus monitor provides a great improvement in system uptime and reduction in system losses.

European Patent Application No. 1,184,772 (Bergroth et al.) discloses a method of protecting a wireless device against viruses, comprising maintaining a database of virus signatures on the device, updating the database by downloading virus signatures in a Short Message Service (SMS) Message, and searching for virus signatures in the memory of or files stored on the wireless device by comparison with the database.

SUMMARY OF THE INVENTION

There is a need in the art to provide for a new system and method of malfunction detection for use with mobile devices. The invention, in some of its aspects, is aimed to provide a novel solution to be effective for attacks by known and unknown malware, capable of discovering malfunction symptoms and enabling an automatic recovery process. In some of its aspects, the invention is further aimed to provide local (intra-device) recovery process with no or minimized escalation to external sources (as, e.g., network-based servers, customer service personal, etc.).

Because of the pervasive and mutant nature of viruses and other attack tools, even the best known anti-virus and firewall systems may fail to protect the integrity of resources and/or data of a mobile device.

The inventors' analysis of nature of the mobile devices and the need for service continuity and availability results in the requirement for automated malfunction diagnostic and local decision making and recovery process when possible.

In accordance with certain aspects of the present invention, there is provided a method for recovering malfunction of at least one resource of a mobile device in response to a malware attack, the method comprising:

(a) diagnosing at least one symptom of malfunction of at least one resource of the mobile device without identifying a reason of the attack; and (b) in response to said diagnosing, recovering at least one resource of the mobile device.

In accordance with further aspects of the invention, the recovering may be provided in respect of said resource with diagnosed malfunction and/or another resource of the mobile device.

According to other aspects of the present invention there is provided a method for applying, in response to an attack caused by known and/or unknown malware, a recovery action to one or more resources of a mobile device, the method comprising:

a) monitoring at least one of said resources for information, possibly indicative of at least one affected resource of the mobile device, and reporting this information or derivative thereof; and b) in response to this reporting, initiating at least one recovery-related action in respect of at least one of said resources in case the received information or derivative thereof meet a certain criterion.

The method may further comprise identifying at least one malfunction event and/or identifying at least one affected resource, and said recovery actions may be provided in escalating extent.

According to other aspects of the present invention there is provided a method of recovering malfunction of one or more resources of a mobile device in response to a malware attack, the method comprising:

a) receiving a notification on malfunction event associated with at least one of said resources; and b) initiating one or more recovery actions in respect to at least one resource for remedying the malfunction, and c) in the case of remedying failure, re-initiating one or more recovery actions of escalating extent.

In accordance with other aspects of the present invention, there is provided a mobile device comprising one or more resources operatively coupled to at least one sensor directly or indirectly coupled to a recovery block, wherein said sensor is configured to monitor at least one of said resources for information, possibly indicative of at least one affected resource, and to report, directly or indirectly, this information and/or derivative thereof to the recovery block; and said recovery block is configured to initiate at least one recovery-related action in respect of at least one of said resources in case the received information and/or derivative thereof meets a certain criterion.

The mobile device may further comprise a fault analysis block operatively coupled with one or more sensors and the recovery block, and configured to receive information from at least one of said sensors, to identify at least one affected resource, and to report this information and/or derivative thereof to the recovery block.

The mobile device may further comprise at least one WatchDog configured to monitor at least one of said resources for live indication of said resource. The WatchDog may be configured to initiate a reset of at least the monitored resource, another resource and/or the entire mobile device upon lack of live indication from said resource within a predefined period of time or to perform full restart of the mobile device.

In accordance with further aspects of the present invention, at least one element of a group comprising one or more sensors, the recovery block, the fault analysis block and one or more WatchDogs may be implemented in a chip constituting a part of the mobile device and/or as a software to be run on one or more resources of the mobile device.

Among advantages provided in accordance with certain aspects of the present invention is the ability to facilitate an immune system that will automatically recognize the attack and/or the affected resources and provide automatic or user-controlled remedy and/or recovery. This immune system will make the mobile device capable of functioning even under attacks of known and/or unknown malware or software malfunction.

BRIEF DESCRIPTION OF THE DRAWINGS

In order to understand the invention and to see how it may be carried out in practice, certain embodiments will now be described, by way of non-limiting example only, with reference to the accompanying drawings, in which.

DETAILED DESCRIPTION OF EXEMPLARY EMBODIMENTS

Figure 1A:
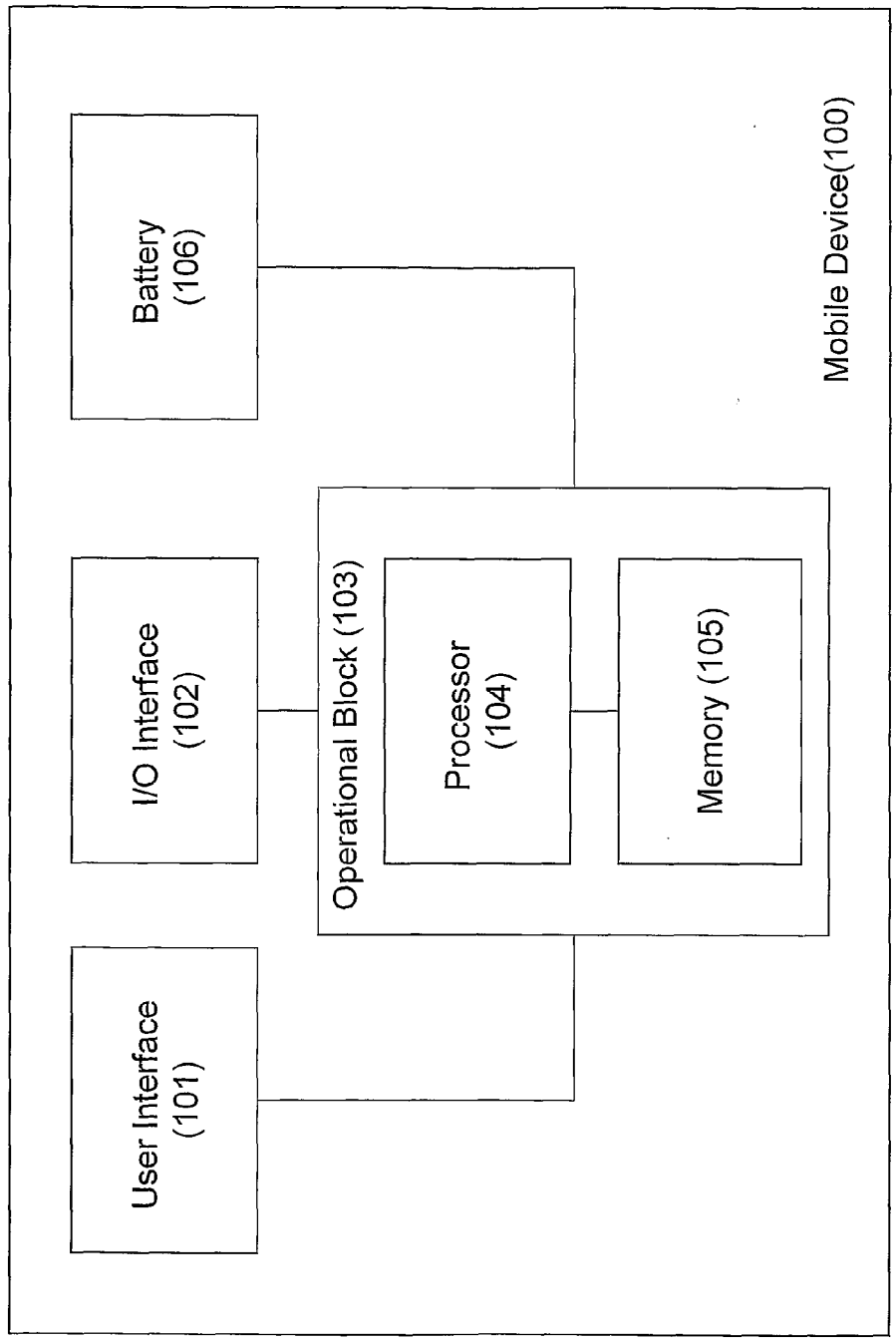
FIGS. 1a and 1b illustrate schematic block diagrams of typical mobile devices as known in the art.

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention. In the drawings and descriptions, identical reference numerals indicate those components that are common to different embodiments, configurations and/or forms of presentation.

Unless specifically stated otherwise, as apparent from the following discussions, it is appreciated that throughout the specification discussions utilizing terms such as, "processing", "computing", "calculating", "determining", or the like, refer to the action and/or processes of a computer or computing system, or processor, or similar electronic and/or optical computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, flash memory (e.g. Disk-on-Key, memory card), smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being operatively coupled to a computer system bus.

The processes/devices (or counterpart terms specified above) and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The term "affected resources" used in this patent specification should be expansively construed to cover any resources indicated to be affected in accordance with received information (and/or derivatives thereof) and/or supposed to be affected in accordance with certain rules.

The term "criterion" used in this patent specification should be expansively construed to cover any compound criterion, including, for example, several criteria and/or their combination.

The term "malfunction" used in this patent specification should be expansively construed to include a result of an attack caused by known and/or unknown malware on at least one resource of a mobile device. The attack may be caused by such reasons as, for example, viruses, worms, Trojan Horses, blended threats, unauthorized changes of device software configuration, or otherwise potentially malicious or suspicious factors and/or combinations thereof which may intentionally compromise/affect or otherwise be harmful to the mobile device and/or its resources.

The term "mobile device" used in this patent specification should be expansively construed to cover any kind of mobile device with communication capabilities, including those adapted for coupling with data, video and/or multimedia terminals. The mobile devices include cellular phones, pagers, radio telephones, cordless telephones, dedicated data units (e.g. PDA), Global Positioning System (GPS) devices, TV-remote control devices, wireless information devices (e.g. car control computers, remote security units, industrial processes control units, remote monitoring units, etc.), wireless adapter devices, play stations, etc. It includes devices able to communicate using mobile radio such as GSM, CDMA, TDMA, GPRS, UMTS, DoPa and any other wireless communications standard, system and/or protocol (e.g. Bluetooth, WiFi, WiMax, Infra Red, wireless LAN, etc.) and variants of evolution thereof. The mobile device may communicate with another mobile device or with other devices (e.g. personal computers, servers, etc.) via all possible networks such as, e.g. cellular networks, broadband networks, fixed line network, data communication networks, Internet network, etc. The mobile device may implement any conventional or specialized operating system, for example, Symbian OS™, Palm™ OS, Windows® CE, EPOC, Mobile Linux, Danger™ Hiptop® OS, Blackberry® OS, proprietary operating systems of cellular handsets (e.g. by Nokia, Samsung, and others), etc.

The mobile devices may further contain smart cards (e.g. subscriber identity module (SIM), functional chip cards, memory cards, etc.). Such mobile devices are generally used, for example, in GSM, 2.5G/GPRS, 3G/UMTS, DECT, etc.

The term "resource" used in this patent specification should be expansively construed to cover any hardware, software, firmware and/or combined functional element of a mobile device, an application comprising at least one process and utilizing at least one of the functional elements, and any other facility of a mobile device (e.g. operating system, execution environment for application, control, processing or other programs; data sets; files; libraries; etc.) required for its operation, administration and/or maintenance.

The term "sensor" used in this patent specification, should be expansively construed to cover any kind of software, hardware, or/and firmware, and/or combinations thereof capable of monitoring the mobile device and/or at least one of its resources, for information possibly indicative of affected resources and, accordingly, of suspicious activity.

Bearing this in mind, attention is drawn to FIG. 1a illustrating a schematic block diagram of a typical mobile device 100 as known in the alt. Typical mobile device 100 accommodates at least one resource.

Referring to FIG. 1a, the mobile device 100 comprises several functional elements: a user interface 101, an input/output interface 102, an operational block 103, a processor 104, a memory 105 and a battery 106. The operational block 103 is operatively coupled to a user interface 101 and to the input/output interface 102. The battery 106 is feeding the mobile device, corresponding functional elements and a processing thereof. The user interface 101 contains (or is functionally associated with) a display and means for user's input (e.g. keyboard, touch screen, control buttons, etc.). The input/output interface 102 is configured for transmitting/receiving signals to/from different external devices (e.g. external servers, PCs, other mobile devices, etc.). The operational block 103 is capable of managing and controlling the operations and features associated with the mobile device, for example, signal transmitting/receiving, signal processing, voice and data communication, user interface support, etc. The operational block contains the processor 104 coupled to the memory 105. Generally, an operating system is run by the processor 104 from the memory 105. The mobile device 100 is capable of requesting and receiving downloads such as, for example, software programs, files, upgrades, e-mails, etc. from an external server.

Figure 1B:
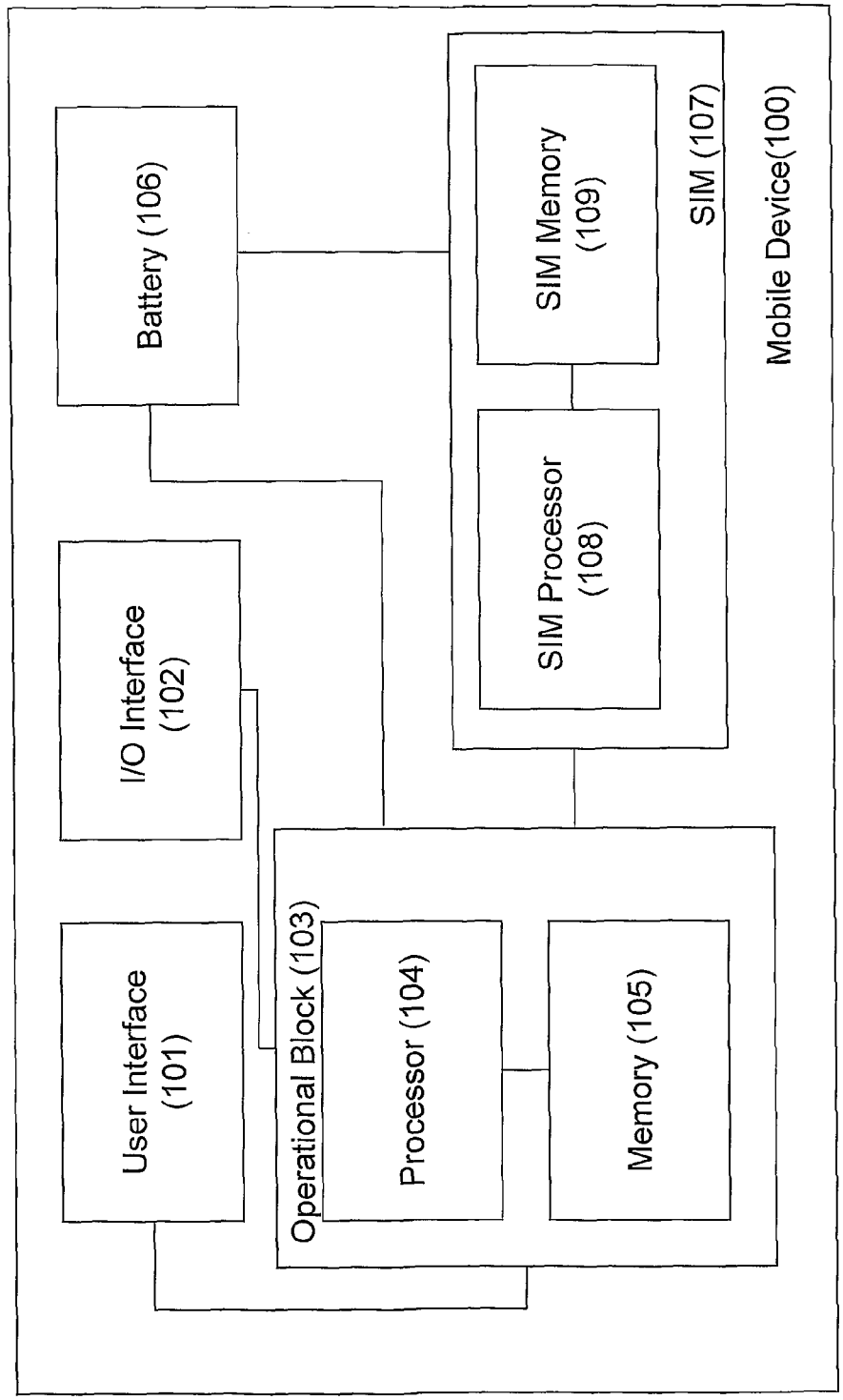

Referring to FIG. 1b, there is illustrated a schematic block diagram of a specific type of mobile device known in the art; namely, the mobile device further containing such functional element as a smart card (e.g. SIM, functional chip cards, etc.). The illustrated mobile device contains Subscriber Identity Module (SIM) 107 operatively coupled to the operational block 103. SIM 107 contains SIM memory 109 operatively coupled with SIM processor 108. Typically, SIM 107 contains user's related information, including user's and device's identification information, personalized settings, phone book, etc.

Both, memory 105 and/or SIM memory 109 may contain firmware and/or application software that are either provided during a manufacture process or later downloaded from an external server owned, for example, by manufacturer, by wireless service provider, by $3^{rd}$ party, etc.).

It should be noted that the invention is not bound by the specific structure of the mobile devices described with reference to FIGS. 1a and 1b. Those versed in the art will readily appreciate that the invention is, likewise, applicable to any other mobile device.

Figure 2A:
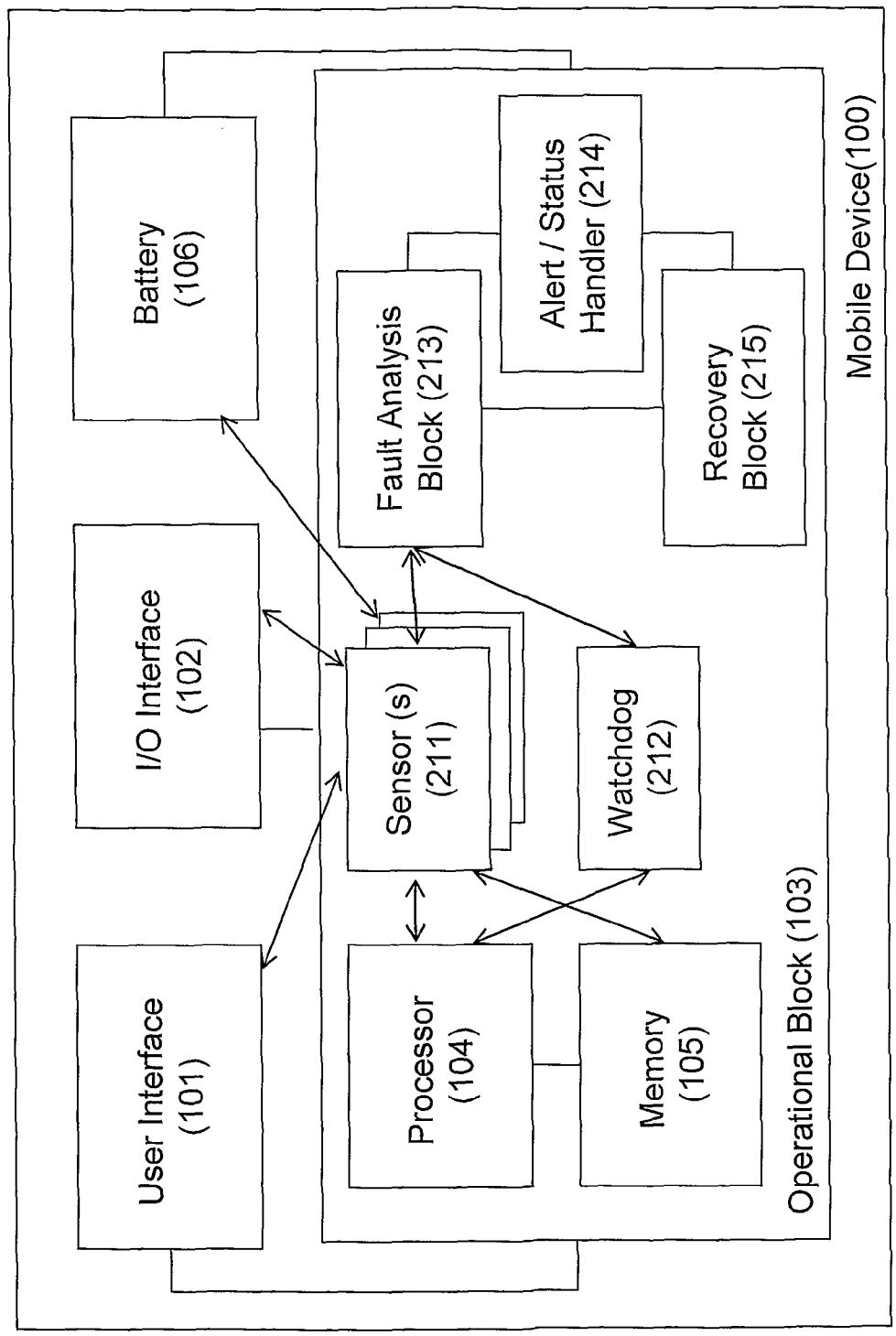
FIGS. 2a and 2b illustrate schematic block diagrams of mobile devices in accordance with certain embodiments of the present invention.
Figure 2B:
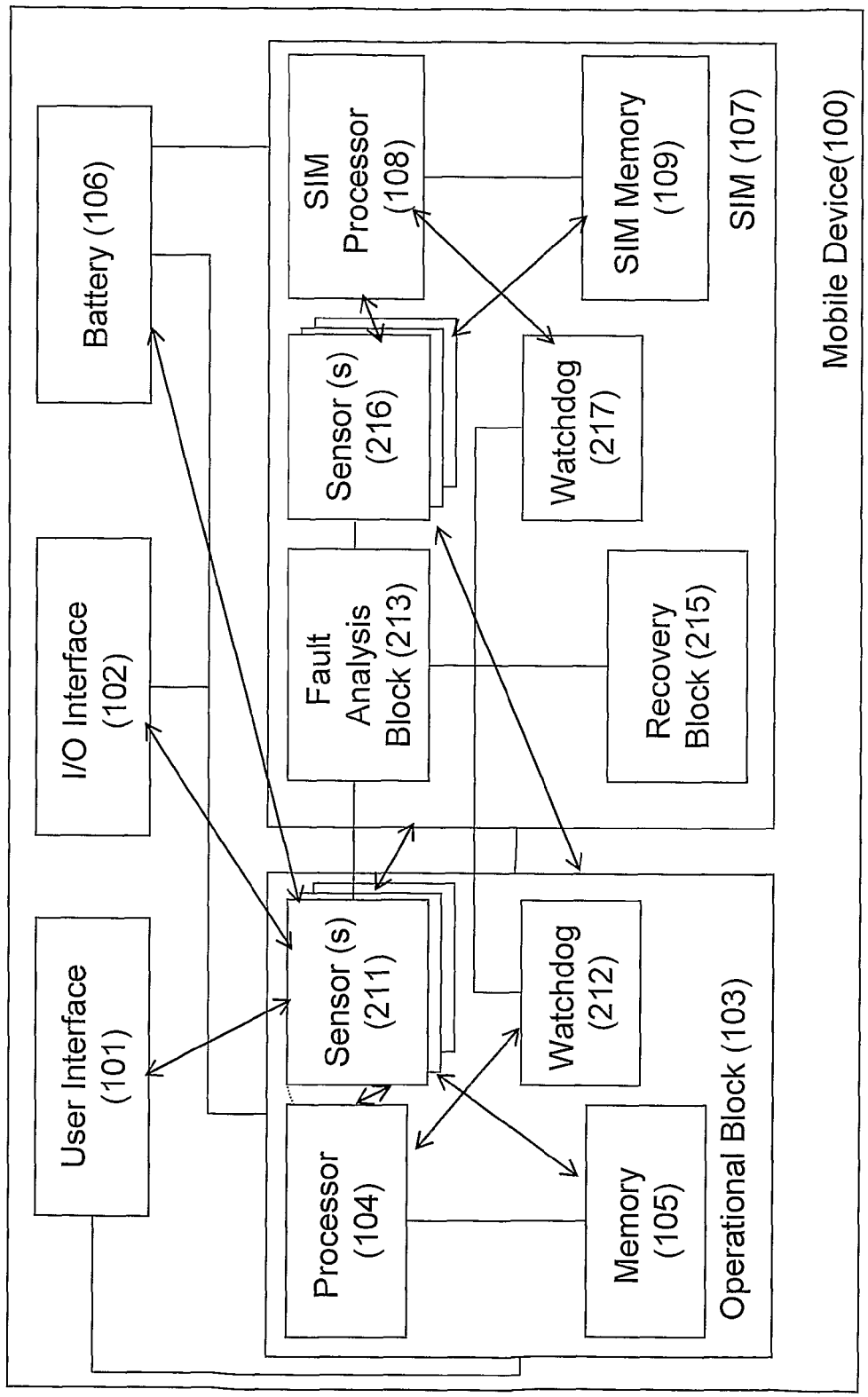

Referring to FIGS. 2a and 2b, there are illustrated schematic block diagrams of mobile devices in accordance with certain embodiments of the present invention. FIG. 2a illustrates a SIM-less embodiment described with reference to FIG. 1a, while FIG. 2b illustrates an embodiment for a mobile device containing SIM as described with reference to FIG. 1b.

In accordance with certain embodiments of the present invention, the mobile device 100 is equipped with at least one sensor 211 capable of monitoring at least one resource of the mobile device. Generally, the sensor is external to and/or independent from the resource it senses. There are several ways of monitoring a resource (e.g. described in Microsoft Smartphone Developer's Guide, http://msdn.microsoft.com/library/default.asp?url=/library/en-us/DevGuideSP/html/Dev_Guide_for_Windows_Mobile-Based-Smartphones.asp and in Microsoft Windows CE platform Manager Help http://msdn.microsoft.com/embedded/windowsce/default.aspx)

for example,
        through information residing in the system (such as operating system activity tables, memory allocation table, etc.),
        via communication with the target module to check its status through protocol defined by the specific block or its drivers,
        by executing an operation on the target block and analyzing the response status or other output, etc.

It should be noted that the invention is not bound by these examples.

For example, the sensors illustrated in FIGS. 2a and 2b may monitor CPU load, free memory, battery depletion rate, data transmission/receiving rates and their correlation, data integrity (e.g. by content sanity check), code integrity (e.g. by using integrity code that was added during installation or during legitimate load to check if the content is valid), input/output rate to storage (e.g. to phone book, user interface operability (e.g. verify that the keyboard and the screen are functional and not corrupted, etc.). In certain embodiments of the present invention, the sensors may monitor also any other resources and their parameters related to an operation of the mobile device. The sensors may send information and/or derivatives thereof for further analysis, decision(s) and/or action(s) constantly, periodically, on-request and/or if occurs a predefined suspicious event (i.e. when received information and/or derivates thereof meet a certain criterion of suspicious behavior).

In certain embodiments of the present invention, the sensor(s) 211 and/or 216 may contain internal logical units capable of processing the received information and deciding if it meets a certain criterion of a suspicious event. Upon registration of the suspicious event (or a set of suspicious events), the sensors send the received information and/or derivatives thereof to a fault analysis block 213. A criterion of a suspicious event may contain a predefined value/range or combination thereof. For example, the criterion may be a combination of a threshold value with a certain period of time (e.g. more than 98% of the processor load for at least 2 seconds is considered a suspicious event, etc.). In certain embodiments of the present invention, the criterion may be a predefined pattern or/and predefined function, to be compared with monitoring behavior characteristics from at least one sensor (e.g. a sequential spike that loads the CPU more than 90% for at least 100 milliseconds each time and repeats for at least 10 times in 30 minutes; transmission of the same SMS serially per address book entries, etc.). In certain embodiments of the present invention, a sensor monitoring a functional element may be aware of an application and/or process running in connection with the block. For example, a sensor monitoring the processor may be also aware of running applications (e.g. games, video, etc.). In different embodiments of the invention, upon registration of suspicious behavior, the sensors may send to the fault analysis block at least one of the following content:

a) all data and/or derivatives thereof received from a monitoring object and meeting the certain criterion,
    b) filtered or processed data and/or derivatives thereof received from a monitoring object and meeting said criterion,
    c) notification of each suspicious event,
    d) notification of a certain suspicious event and/or certain set of suspicious events,
    e) others may also apply.

The fault analysis block 213 is configured to aggregate and analyze information received from several sensors in order to identify the malfunction event and the affected resources (e.g. blocks, processes, etc.). The analysis of the aggregated information is also helpful for preventing false positive reaction and for defining severity of the problem. Not every suspicious event shall be identified as a malfunction event. For example, running of processor-consuming application (e.g. video) may be a legitimated reason of the processor overload recognized as a suspicious event, but not malfunction event. The fault analysis block may contain pre-defined criterion/pattern for identification of malfunction event. In certain embodiments of the invention, the fault analysis block may also be configured to provide correlation analysis of data received from different sensors or other adaptive mechanism of malfunction event identification. The correlation analysis of received data may include analysis for predefined states, per predefined rules, and/or per predefined relationships, etc. and may include identification of patterns, common causes, root causes, etc. The fault analysis block 213 may also have capabilities of learning the monitoring behavior of the mobile device and fitting and/or modifying certain criterion accordingly.

In certain embodiments of the invention, the mode of communication between a sensor and the failure analysis block may be configurable and may be different for different sensors or for the same sensor. For example, if sensor A sends to the fault analysis block information about a suspicious event (e.g. about suspicious depletion rate of the battery, high continuous transmission rate, etc.), in order to identify the problem, the fault analysis block may request another sensor(s) (e.g. sensor B) for information (e.g. which applications are being run by the processor). In this case sensor B will send the information per request, and not upon suspicious event registered by this sensor.

In certain embodiments of the present invention, the sensors (or some of them) may be implemented with no logical capabilities; and the fault analysis block may be configured to analyze the information received from the sensors (either in pull or push mode) also in order to define suspicious events.

The fault analysis block is operatively coupled with a recovery block 215 capable of facilitating at least one recovery-related action.

In certain embodiments of the present invention, the fault analysis block is optional and the sensors (or some of them) may send information directly to the recovery block. The functionality of the fault analysis block may be not implemented or implemented partly or entirely), divided between the sensors and the recovery block. The operation of the recovery block will be further detailed with reference to FIG. 4.

In certain embodiments of the invention, the fault analysis block 213 and/or recovery block 215 are operatively coupled to an alert/status handler 214. Upon identification of malfunction event, the failure analysis block forwards the information to the alert/status handler which is configured to send an alert via at least one of different types of media available to the mobile device under conditions of current malfunction. The alerts may be sent to predefined external system(s) (e.g., management system, central monitoring device, etc.) in a format matching the system and may contain notification and/or information about the malfunction event. In certain embodiments of the present invention the alert/status handler may also contain an information log (not presented in FIGS. 1 and 2). In certain embodiments of the present invention, the information log may be also located in the memory 105 or in the SIM memory 109 or be distributed between different modules.

In certain embodiments of the invention, the mobile device 100 may also contain a WatchDog 212. The term WatchDog used in this patent specification, should be expansively construed to cover any kind of software, hardware, firmware and/or combinations thereof operatively connected to a processor and capable of registering the processor malfunctions resulting in stop-responding. The WatchDog senses periodically the operation of the processor and its operating system, and/or the processor and/or applications running on the processor through signals sent periodically to the WatchDog. If the WatchDog doesn't receive this signal within the set period of time, it would initiate immediate recovery activities such as, for example, reset at least one resource or the entire system and/or restore configuration. The WatchDog may also report the failure to the fault analysis block 213 which initiates additional recovery activities subject to the fault analysis results. In certain embodiments of the invention, if the WatchDog doesn't receive said signal within the set period of time, it may just report to the recovery block 215 which will activate the recovery activities.

Attention now is drawn to FIG. 2b illustrating, by way of non-limiting example, certain embodiments of the present invention for use in a SIM-comprising mobile device. In the illustrated embodiment, the SIM 107 contains sensor(s) 216 and WatchDog 217 operatively connected with the SIM processor 108. The sensors 216 are configured to monitor SIM processor 108, SIM memory 109 and overall operational block 103 (e.g. activity of the operating system). The sensors 211 are configured to monitor also SIM 107.

Those skilled in the art will readily appreciate that the invention is not bound by the configuration of FIGS. 2a and 2b; equivalent and/or modified functionality may be consolidated or divided in another manner. The present invention may be implemented for SIM-comprising mobile devices in a manner illustrated for SIM-less mobile devices. Also the present invention may be implemented for the mobile devices comprising other than SIM smart cards in a manner described in the reference to SIM-comprising mobile devices.

In certain embodiments of the present invention, at least part of the recovery initiating functionality may be also implemented within the sensors. The sensors may contain recovery script associated with and triggered by certain suspicious events or combinations thereof. In such case, when the event occurs, the script operates.

Figure 3A:
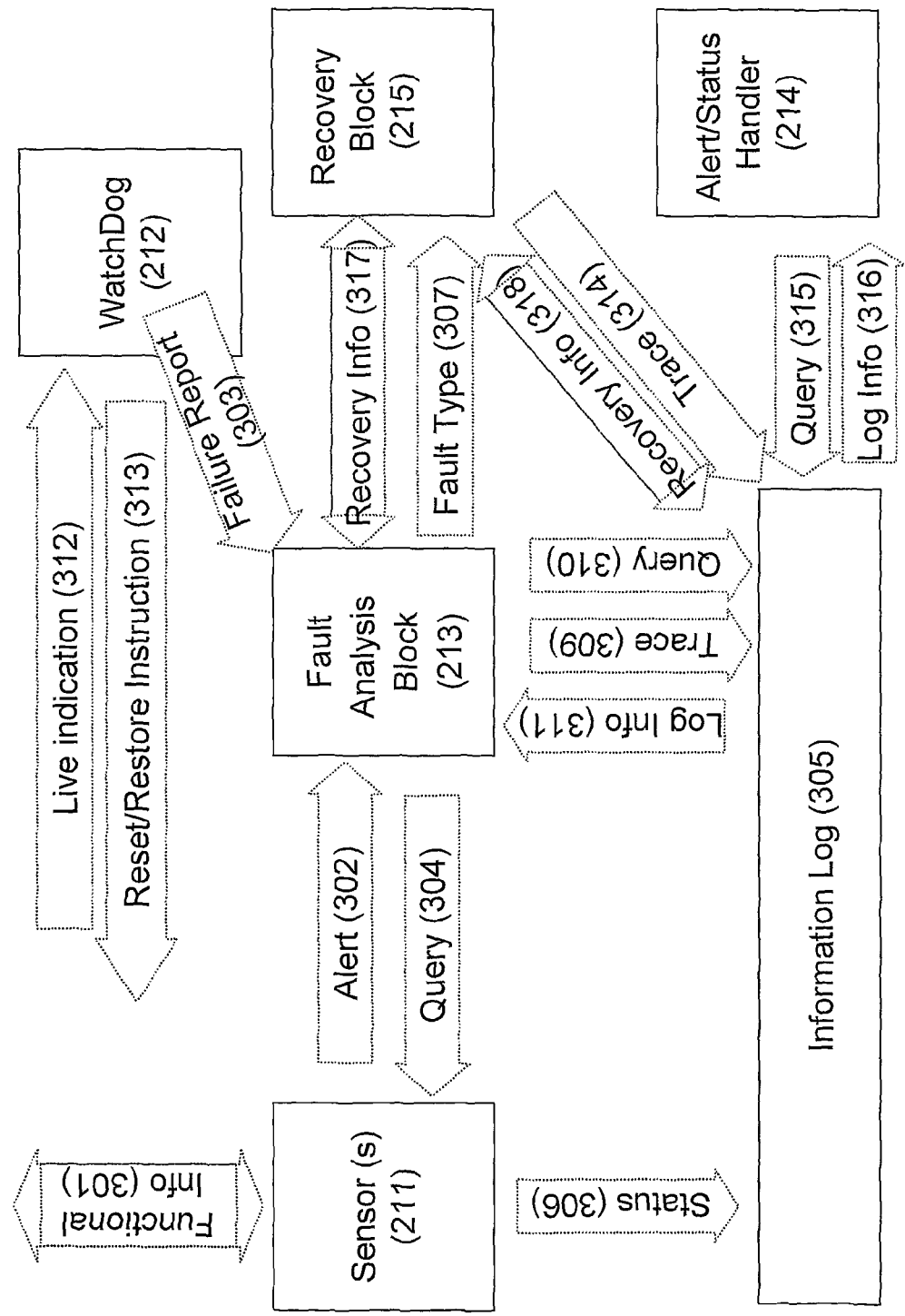
FIG. 3a illustrates a generalized diagram of operational interfaces in accordance with certain embodiments of the present invention.

Referring to FIG. 3a, there is illustrated a non-limiting example of a generalized diagram of operational interfaces in accordance with certain embodiments of the present invention.

The sensor 211 interfaces the monitoring module(s), process(s) and/or application(s) to receive operational information for further analysis 301. In case of a suspicious event, the sensor sends an alert 302 to the fault analysis block 213. This alert may also contain data and/or derivatives thereof sampled by the sensor. The fault analysis block may also initiate retrieving up-to-date status and sampled data and/or derivatives thereof by sending a query 304 to the sensor. The sensor may also interface the information log 305 for sending (constantly, periodically and/or per pre-defined criterion) the status info 306 to be saved in the log.

The fault analysis block 213 analyzes the information received from the sensor(s) in order to define the malfunction event, its severity, affected resources and/or a type of fault, and reports 307 the results to the recovery block. The fault analysis block may use, for example, a look-up table in order to determine if and what validation operations (e.g. integrity checks, memory allocation check, etc.) are required, which resource(s) and what type of resource(s) may be affected, etc. For example, upon CPU overload, it may check which processes consume exceptionally high CPU process load. If such processes are found, it will further check if such consumption is "valid" by the specific processes. The fault analysis block also sends information to the information log 305 for tracing 309 the fault analysis operation and decisions. The fault analysis block may also send a query 310 to the log and receive corresponding information 311.

The WatchDog (212 and/or 217) continuously receives a live indication 312 from the monitoring CPU(s) and/or OS and, upon a failure (if at least one of the monitored resources is not running), sends a reset/restore instruction 313. The WatchDog interfaces the fault analysis block 213 for sending failure reports 303; and, optionally, interfaces the recovery block 215 for sending a recovery trigger (not shown) if the recovery is to be facilitated by the recovery block.

The recovery block 215 interfaces the fault analysis block (and, optionally, with the WatchDog(s)) for receiving the malfunction information 307; and interfaces the information log for tracing 314 the recovery decisions and operation.

The information log 305 maintains historical information on status of sensors and/or decisions and operations of the fault analysis block and the recovery block. This information may be sent to an external system by the alert/status handler. The alert/status handler 214 may also send a query 315 to the log and receive 316 corresponding information.

In certain embodiments of the invention, the recovery block 215 may also interface the fault analysis block 213 for requesting and receiving information 317 during a recovery process. In certain embodiments of the present invention, the recovery block 215 may request and receive information 318 for recovery process via interface with the information log 305.

The functionality disclosed in the present invention may be implemented in several ways, for example:
- partly or entirely in hardware (e.g. ASIC—Application Specific Integrated Circuit that is designed to implement such a feature. Such ASIC may be a self-contained component or integrated into hardware component that implements other functionalities such as a CPU, a co-processor or any other component);
- partly or entirely in software;
- partly or entirely in microcode/firmware (e.g. as a set of software instructions directly operating machine code and optimized for fast execution);
- combination of the above (e.g. some parts of the system may be implemented within CPU or other components with processing capability, e.g., ASIC; other parts may be implemented in micro-code and the rest in software as illustrated in FIG. 3b.

Figure 3B:
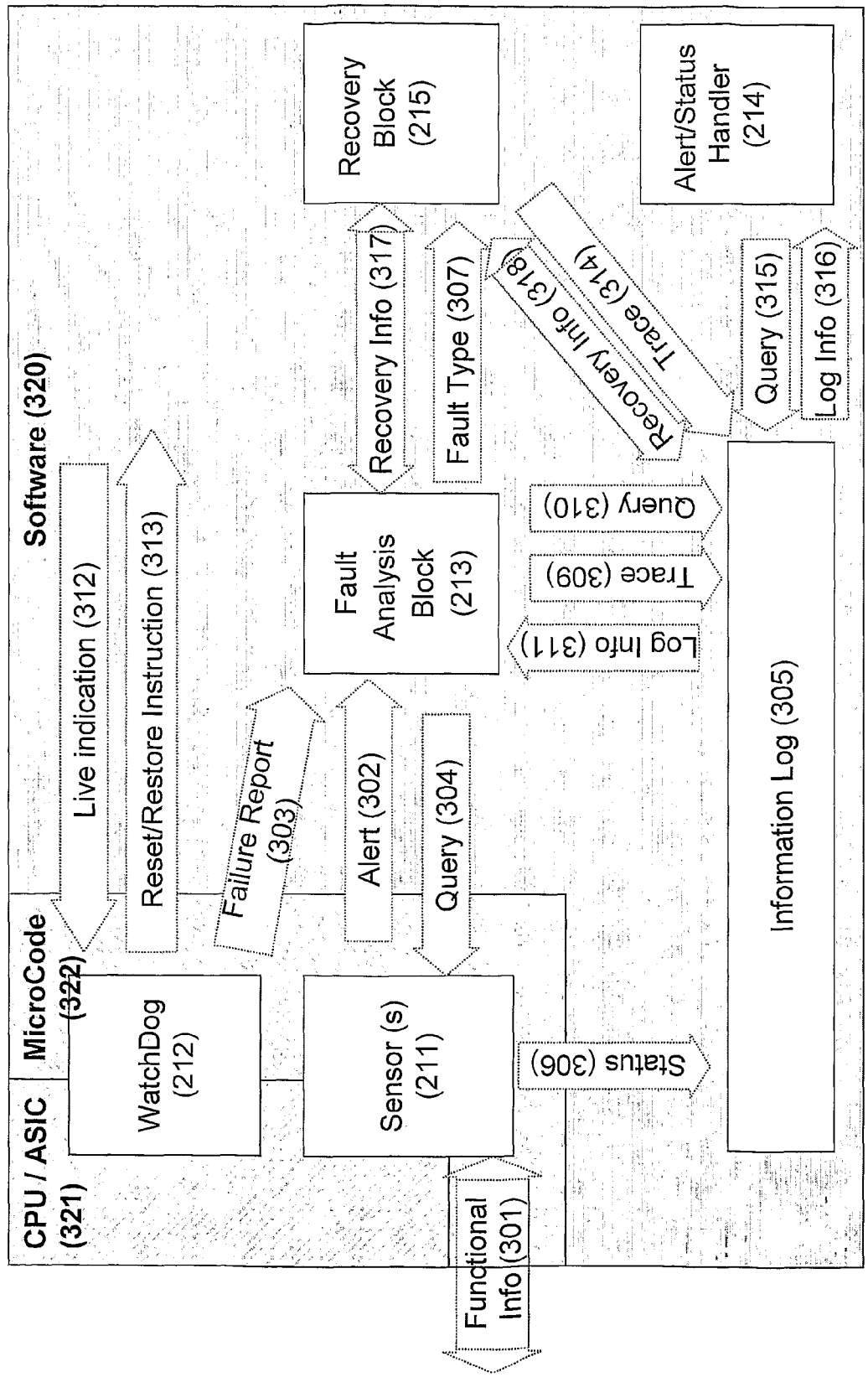
FIG. 3b illustrates the generalized diagram illustrated in FIG. 3a with exemplified implementation divided between software, firmware and hardware in accordance with certain embodiments of the present invention.

FIG. 3b illustrates the generalized diagram illustrated in FIG. 3a with exemplified implementation divided between software, firmware and hardware in accordance with certain embodiments of the present invention: some of the sensors are implemented in ASIC (321), the sensors are monitored and operated through interface micro-code programs (322), while the other blocks of the system are implemented by software (320). In certain embodiments of the invention the implementation of at least part of the functionalities in ASIC and/or Microcode may be provided within the main CPU, one or more peripheral components with processing capabilities, within the SIM and/or in combination thereof.

In certain embodiments of the present invention the entire functionalities or at least part thereof (e.g. one or more sensors, recovery block, WatchDog, etc.) may be implemented in a chip or/and in a smart card. Said chip/smart card may constitute a part of the mobile device or part of another device to be operatively coupled with the mobile device.

In certain embodiments of the present invention the entire functionalities or at least part thereof (e.g. one or more sensors and the recovery block) may be implemented as a software. Said software may run on one or more resources of the mobile device and/or of another device operatively coupled to the mobile device.

Figure 4:
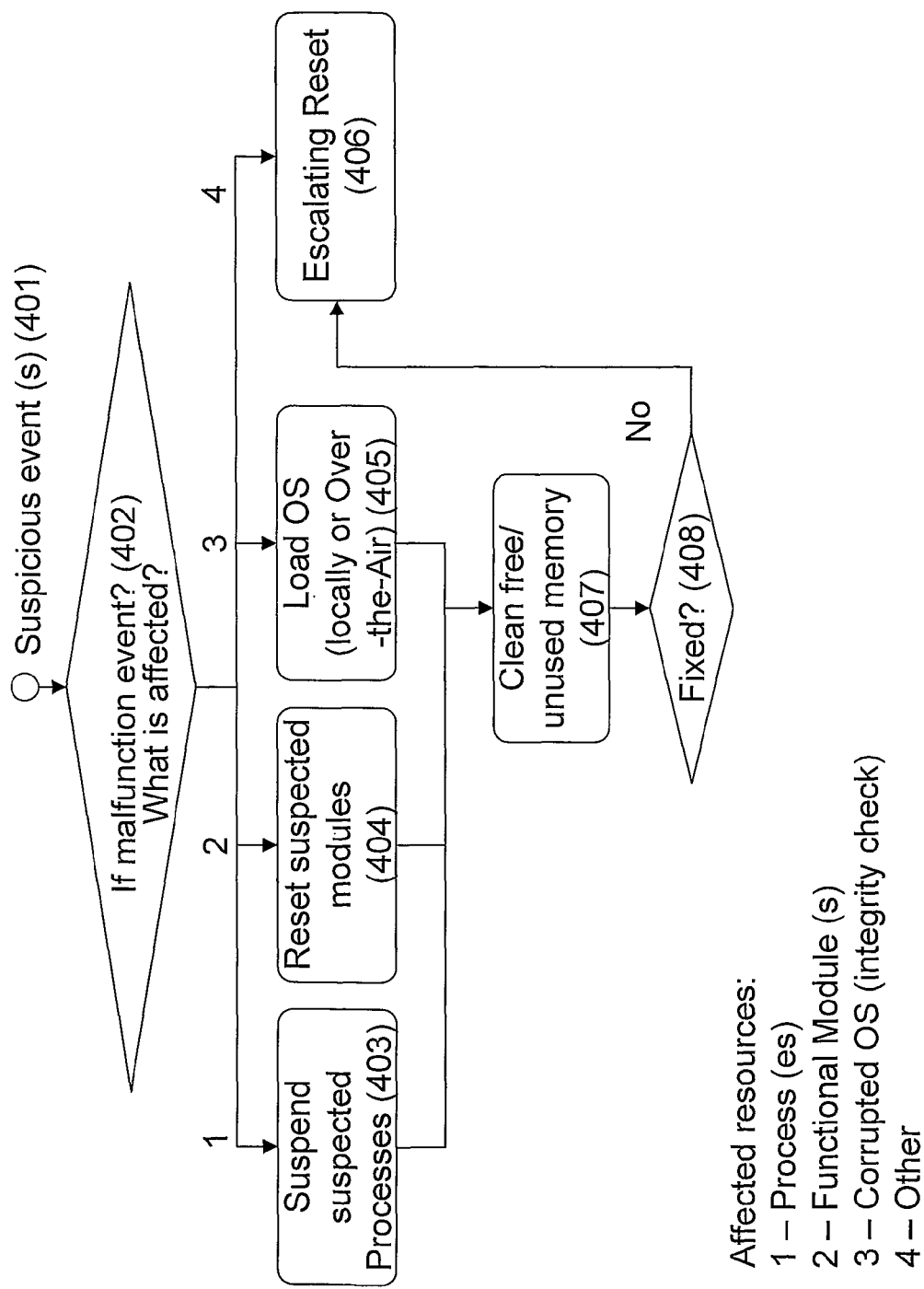
FIG. 4 is a generalized flow chart of recovery steps in accordance with certain embodiments of the present invention.

Referring to FIG. 4, there is illustrated a generalized flow chart of recovery steps in accordance with certain embodiments of the present invention. When the fault analysis block receives information on a suspicious event 401 from the sensor(s), it checks 402 whether said event is malfunction, what is affected and informs the recovery block. The recovery block initiates recovery steps in accordance with affected resources. For example, the recovery block may initiate suspending suspected process(es) 403 and reset the suspected modules 404. If the operating system (OS) is corrupted, the recovery block may initiate OS reloading 405 locally or remotely (e.g. over-the-air).

The reloading may be implemented by using different techniques, for example as disclosed in US Patent Application No. 2005/079,863; U.S. Pat. No. 6,549,771; U.S. Pat. No. 6,215,994, US Patent Application No. 2005/064,847 and/or others.

US Patent Application No. 2005/079,863 discloses over-the-air provisioning of mobile device settings. In response to a request for mobile service subscription options received from the mobile device, data relating to mobile service subscription options, for selection by a user of the mobile device, may be sent to the mobile device over a wireless communication path. A selection of one or more subscription options may be received from the mobile device over the wireless communication path, and a service corresponding to the selected subscription options may be activated in response to the selection. Settings associated with the selected subscription options may be downloaded over-the-air to the mobile device, which may store the settings to enable the mobile device to access the subscription.

U.S. Pat. No. 6,549,771 discloses a method and system for programming a mobile telephone over the air within a mobile telephone communication network. The mobile telephone communication network includes an over-the-air function, a customer service center, a mobile switching center, a base station controller, and multiple base transceiver stations. The over-the-air function, using the mobile switching center, the base station controller, and one of the base transceiver stations for transport, initially sends a request over-the-air to a mobile telephone within the mobile telephone communication network to interrogate the mobile telephone's protocol capability. In response to the request, the mobile telephone sends a protocol capability response message over-the-air back to the over-the-air function. The protocol capability response message includes a BAND_MODE_CAP field that describes the band and mode capability information of the mobile telephone. In addition, the protocol capability response message may also include a SERVICE_OPTION field that describes the service options supported by the mobile telephone.

U.S. Pat. No. 6,215,994 discloses a system and method for over-the-air programming of mobile stations. The mobile station includes a memory storing user preference information, a receiver adapted to receive an over-the-air information signal including user preference information, and a user preference program in the mobile station adapted to change the user preference information in the memory according to user preference information in a received over-the-air information signal. The mobile station is remote from a master control unit selectively capable of being activated for transmitting the over-the-air information including select user preference information input at the master control unit.

US Patent Application No. 2005/064,847 discloses a system and method for over-the-air modifying the area code upon authorization from the carrier. The wireless communication device contains a table of valid area codes in persistent memory. The table defines the complete set of area codes that can be used by the wireless communication device. The wireless device is capable of receiving an instruction from the network that causes the current area code to be changed to a new area code from the table of valid area codes. Alternatively, the wireless device is capable of receiving an instruction from the network that causes the current table of area codes to be replaced with a new table of area codes that is received from the network along with the instruction. After installation of the new table of valid area codes, the wireless communication device can be instructed to change from the current area code to a new area code in the new table of valid area codes.

The steps 403-405 are followed by cleaning 407 free/unused memory (e.g. writing an arbitrary value to this memory) and testing 408 if the problem has been fixed (e.g. by requesting the fault analysis block or/and information log). If the problem still exists, the recovery block will activate 406 a process of escalating reset further described with reference to FIG. 6. If the affected resources are other than a process, a module and/or OS (e.g., configuration problems, full memory caused by non-identified task, CPU overloaded by non-identified process, etc.), the recovery block will activate 406 the process of escalating reset.

Figure 5:
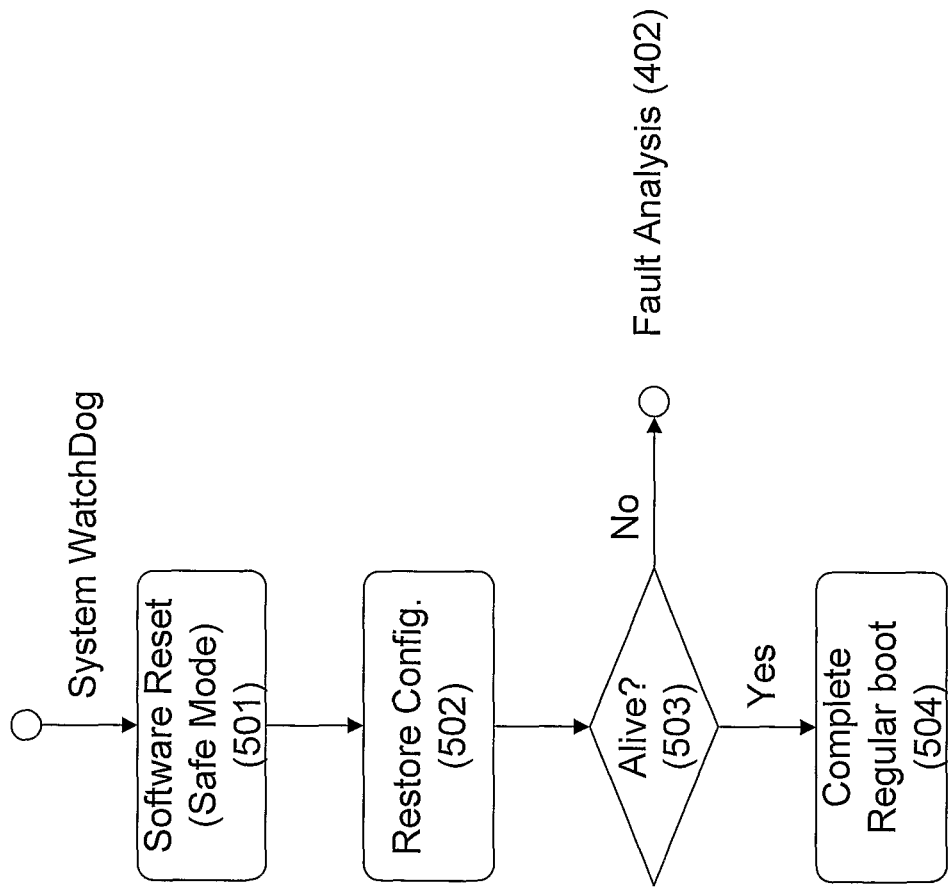
FIG. 5 is a generalized flow chart of WatchDog initiated recovery in accordance with certain embodiments of the present invention.

FIG. 5 illustrates a generalized flow chart of recovery initiated by the WatchDog in accordance with certain embodiments of the present invention.

If the WatchDog does not receive a live indication from the monitored CPU(s) and/or OS within the set period of time, it will initiate software reset 501 followed by controlled and gradually reboot of the operating system and by configuration restore 502. If later testing 503 does not provide a live indication, the WatchDog will inform the Fault Analysis Block about a suspicious event needed to be handled in accordance with the procedure described with reference to FIG. 4. Upon success of reset/restore activities, the system will complete a regular boot 504.

Figure 6:
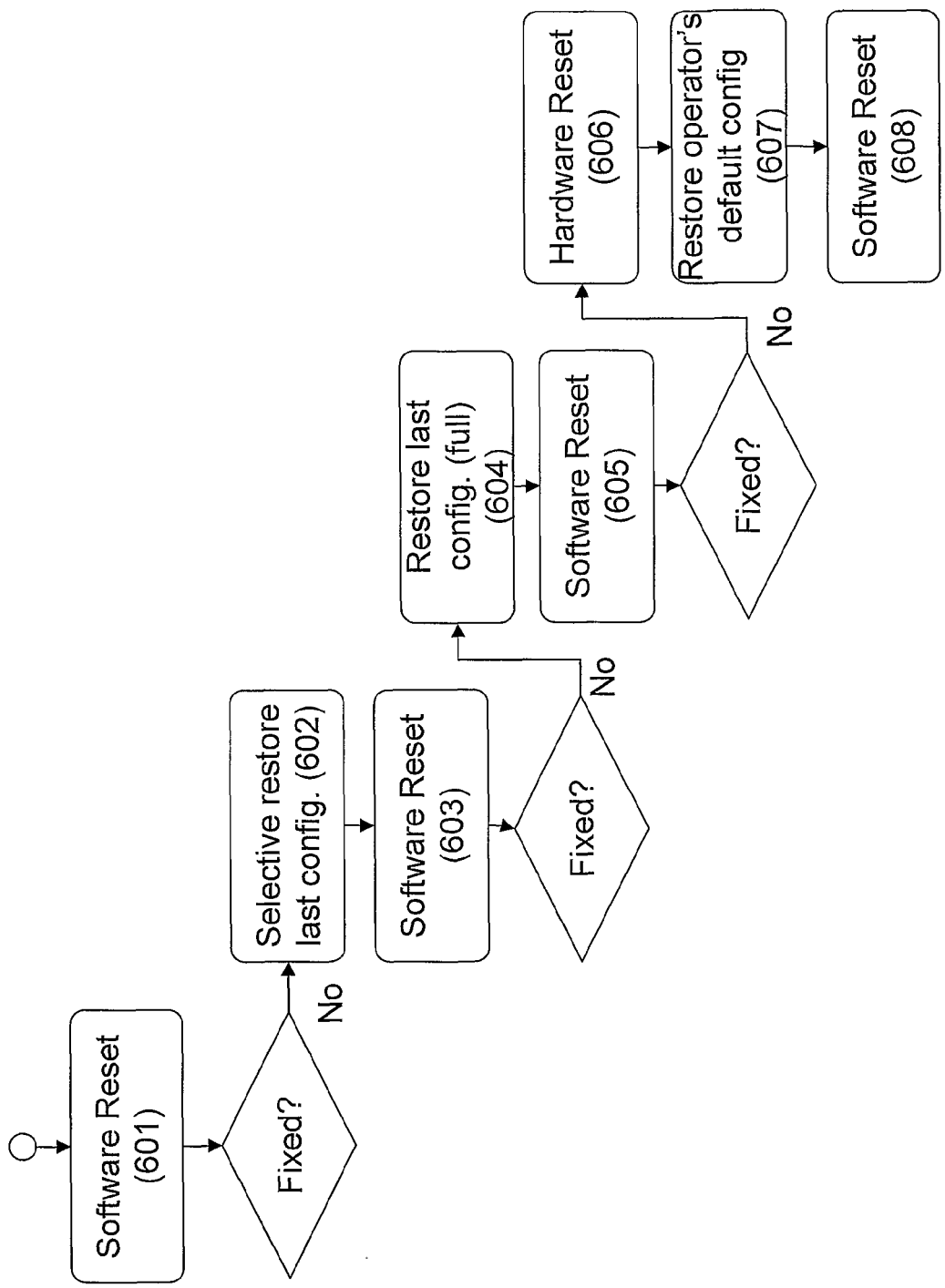
FIG. 6 is a generalized flow chart of escalating reset in accordance with certain embodiments of the present invention.

Referring now to FIG. 6, there is illustrated a generalized flow chart of escalating reset in accordance with certain embodiments of the present invention. The escalating reset starts with a software reset of the system 601. The further escalating action is to provide a restore of configuration 604 followed by software reset 605. (Optionally, this step may be divided into two stages: selective restore of previous configuration (e.g. configuration of the affected modules only) 602 followed by software reset 603 and, if not fixed, full configuration restore). If the problem still exists, the next action of escalating extent is to provide hardware reset 606, restore the operator's default configuration 607 and provide next software reset 608.

It should be noted that the invention is not bound by the specific actions described with reference to FIG. 6 and other actions of escalating extent may be pre-configured for recovery process.

For example, the actions of escalating extent may be selected from the following group:
a) reboot the mobile device software;
b) reboot the mobile device software gradually;
c) reset at least one functional element of the mobile device;
d) reboot the entire mobile device;
e) restore a previous configuration of at least one affected resource;
f) restore a previous configuration of all affected resources;
g) restore of the previous configuration of all resources;
h) reinstall at least one applications from a local source;
i) reinstall at least one application from a remote source;
j) reinstall at least one driver from a local source;
k) reinstall at least one driver from a remote source;
l) reinstall at least part of the operating system from a local source;
m) reinstall at least part of the operating system from a remote source;
n) reinstall the entire software of the mobile device from a local source;
o) reinstall the entire software of the mobile device from a remote source;
p) restore a default configuration as set by the operator of the mobile device;
q) restore a default configuration as set by the manufacturer of the mobile device;
r) restore the user's data that is stored within in the mobile device; and
s) restore a the user's data from a remote backup source.

It is also to be noted that in certain embodiments of the invention initiating of each of recovery action may be initiated with no involvement of any factor external to the mobile device, while in other embodiments initiating at least pair of recovery actions requires involvement of at least one external factor (e.g. for authorization, confirmation of availability, etc.). In certain embodiments of the invention at least part of recovery actions may be provided with no involvement of any factor external to the mobile device.

It will also be understood that the system according to the invention, may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It is also to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based, may readily be utilized as a basis for designing other structures, methods, and systems for carrying out the several purposes of the present invention.

Those skilled in the art will readily appreciate that various modifications and changes can be applied to the embodiments of the invention as hereinbefore described without departing from its scope, defined in and by the appended claims.

The invention claimed is:

1. A method of recovering from a malfunction of at least one resource of a mobile device in response to a malware attack, the mobile device including a processor, the at least one resource being coupled to at least one sensor, the at least one sensor being coupled to a fault analysis block and to the processor, the fault analysis block being coupled with the recovery block, the method comprising the procedures of:
monitoring by said at least one sensor said at least one resource for information possibly indicative of an affected said at least one resource from said malware attack, said monitoring including at least periodically sensing operation of said at least one resource, in anticipation of receiving signals from respective said at least one resource within a set time period;
determining whether said information meets at least one criterion of a suspicious event possibly indicative of malfunction of said at least one resource;
diagnosing said suspicious event by said fault analysis block to determine whether said suspicious event is to be identified as a malfunction event of said at least one resource; and
initiating at least one recovery-related action in an escalating extent by said recovery block, according to at least one of the following criteria:
said suspicious event is identified as said malfunction event, and
failure to receive said signals within said set period of time.

2. The method according to claim 1, wherein said procedure of initiating at least one recovery-related action is with respect to a resource other than said at least one resource identified having said malfunction event.

3. The method according to claim 1, wherein said procedure of initiating at least one recovery-related action is performed with no involvement of a factor external to said mobile device.

4. The method according to claim 1, further comprising a procedure of sending an alert to at least one predefined external system, by an alert/status handler, upon identification of said suspicious event to be said malfunction.

5. The method according to claim 4, wherein said predefined external system is selected from a management system and a central monitoring device.

6. The method according to claim 1, wherein said at least one criterion of said suspicious event is selected from a group consisting of:
substantial processor load of said mobile device;
running of a processor-consuming application on said mobile device;
a predefined pattern compared with monitored behavior characteristics by said at least one sensor;
a particular depletion rate of a battery of said mobile device; and
a high continuous transmission rate.

7. The method according to claim 1, wherein said at least one resource is selected from a group consisting of:
hardware of said mobile device;
software of said mobile device;
firmware of said mobile device;
a functional element of said mobile device;

a functional path of said mobile device;
an execution environment and processes thereof;
data sets, files, and libraries of said mobile device; and
a remote device management agent.

8. The method according to claim 1, wherein said monitoring is of a resource selected from a group consisting of:
   information residing in an operating system of said mobile device;
   communication with said at least one resource;
   executing an operation of said at least one resource and analyzing either one of a response status and output;
   central processing unit (CPU) load;
   accepting a signal to be received within a predefined time interval;
   emulation of a process and analysis of respective responses;
   free memory;
   battery depletion rate;
   data transmission rate;
   data receiving rate;
   correlation between data transmission rate and data receiving rate;
   data integrity;
   code integrity;
   input rate to storage;
   output rate to storage; and
   user interface operability.

9. The method according to claim 1, wherein said procedure of diagnosing of said suspicious event is according to at least one criterion selected from a group consisting of:
   predefined criterion;
   predefined pattern; and
   correlation analysis of data received from different ones of said at least one sensor.

10. The method according to claim 9, wherein said correlation analysis is selected from a group consisting of:
    analysis for predefined states;
    analysis of predefined rules;
    analysis of predefined relationships;
    identification of patterns;
    identification of common causes; and
    identification of root causes.

11. The method according to claim 1, further comprising a procedure of modifying said at least one criterion according to monitored behavior of said mobile device.

12. The method according to claim 1, further comprising a procedure of providing said content relating to said suspicious event, via said at least one sensor, directly to said recovery block.

13. The method according to claim 1, further comprising a procedure of registering malfunctions of said processor that result in non-responsiveness of either one of said processor and an operating system of said mobile device.

14. The method according to claim 1, further comprising a procedure of initiating a remediation activity in case of non-reception of a predetermined periodic signal from said processor.

15. The method according to claim 1, wherein said procedure of diagnosing determines whether said suspicious event meets said at least one criterion according to a look-up table.

16. The method according to claim 1, further comprising a procedure of continuously receiving a live indication via said monitoring by said at least one sensor, of halting of said at least one resource.

17. The method according to claim 1, wherein said procedure of diagnosing is initiated by a factor that is external to said mobile device.

18. The method according to claim 17, wherein said factor is a user of said mobile device.

19. The method according to claim 7, wherein said procedure of diagnosing further comprises a procedure of further analysis of said suspicious event if said at least one sensor fails to receive at least part of a test signal sent through said functional path, via a respective one of said at least one sensor of said mobile device.

20. The method according to claim 1, wherein said procedure of initiating at least one recovery-related action is selected from a group consisting from the procedures of:
    suspending suspected processes running on said mobile device;
    resetting of suspected modules running on said mobile device;
    loading of an operating system running on said mobile device; and
    executing a process of escalating reset of said mobile device.

21. The method according to claim 20, further comprising a procedure of cleaning free and unused memory of said mobile device after any one of said procedures of suspending, resetting and loading.

22. The method according to claim 21, further comprising a procedure of testing whether said recovery-related action fixed said malfunction.

23. The method according to claim 1, wherein said at least one recovery-related action is selected from the group consisting of:
    rebooting said mobile device software;
    rebooting said mobile device software gradually;
    resetting at least one functional element of said mobile device;
    rebooting entire said mobile device;
    restoring a previous configuration of at least one affected said at least one resource;
    restoring of a previous configuration of all affected said at least one resource;
    restoring of previous configuration of all said at least one resource;
    reinstalling at least one application from a local source;
    reinstalling at least one application from a remote source;
    reinstalling at least one driver from a local source;
    reinstalling at least one driver from a remote source;
    reinstall at least part of an operating system of said mobile device from a local source;
    reinstalling at least part of an operating system of said mobile device from a remote source;
    reinstalling entire software of said mobile device from a local source;
    reinstalling entire software of said mobile device from a remote source;
    restoring a default configuration as set by an operator of said mobile device;
    restoring a default configuration as set by the manufacturer of said mobile device;
    restoring user data that is stored within in said mobile device; and
    restoring user data from a remote backup source.

24. The method according to claim 1, wherein said malware attack is selected from a group consisting of: viruses, worms, Trojan Horses, blended threats, unauthorized changes of device software configuration, potentially malicious factors, suspicious factors that intentionally compromise said mobile device, factors harmful to said mobile device and to said at least one resource.

25. A mobile device, operative to recover from a malware attack thereon, the mobile device comprising a processor, at least one resource operatively coupled to at least one sensor, the at least one sensor coupled to a fault analysis block and to the processor, a watchdog coupled with the processor, the fault analysis block being coupled with the recovery block, wherein:

said at least one sensor monitoring said at least one resource for information possibly indicative of an affected said at least one resource from said malware attack, said monitoring including at least periodically sensing by said watchdog, operation of said at least one resource, in anticipation of receiving signals from said respective at least one resource within a set period of time, said at least one sensor determining whether said information meets at least one criterion of a suspicious event possibly indicative of malfunction of said at least one resource and providing said information to said fault analysis block, said fault analysis block diagnosing content relating to said suspicious event to determine if said suspicious event is identified as a malfunction of said at least one resource, said recovery block receives information relating to said suspicious event identified to be said malfunction of a respective one of said at least one resource and further receives reports in case said watchdog fails to receive said signals within said set period of time, and in response, said recovery block initiates at least one recovery-related action in an escalating extent.

26. The mobile device according to claim 25, wherein initiation of said at least one recovery-related action is with respect to a resource other than said at least one resource identified having said malfunction event.

27. The mobile device according to claim 25, wherein said at least one recover-related action is performed with respect to said at least one resource other than that which is malfunctioned.

28. The mobile device according to claim 25, wherein said at least one sensor includes a logical unit for processing said information indicative of said possible malfunction.

29. The mobile device according to claim 25, wherein said mobile device further comprises an alert/status handler coupled to either one of said fault analysis black and said recovery block, said alert/status handler sends an alert to at least one predefined external system, upon identification of said suspicious event being said malfunction.

30. The mobile device according to claim 29, wherein said predefined external system is selected from a management system and a central monitoring device.

31. The mobile device according to claim 25, wherein said at least one criterion of said suspicious event is selected from a group consisting of:
substantial processor load of said mobile device;
running of a processor-consuming application on said mobile device;
a predefined pattern compared with monitored behavior characteristics by said at least one sensor;
a particular depletion rate of a battery of said mobile device; and
a high continuous transmission rate.

32. The mobile device according to claim 25, wherein said at least one resource is selected from a group consisting of:
hardware of said mobile device;
software of said mobile device;
firmware of said mobile device;
functional element of said mobile device;
functional path of said mobile device;
execution environment and processes thereof;
data sets, files, and libraries of said mobile device; and
remote device management agent.

33. The mobile device according to claim 25, wherein said monitoring is of a resource selected from a group consisting of:
information residing in an operating system of said mobile device;
communication with said at least one resource;
executing an operation of said at least one resource and analyzing either one of a response status and output;
central processing unit (CPU) load;
accepting a signal to be received within a predefined time interval;
emulation of a process and analysis of respective responses;
free memory;
battery depletion rate;
data transmission rate;
data receiving rate;
correlation between data transmission rate and data receiving rate;
data integrity;
code integrity;
input rate to storage;
output rate to storage; and
user interface operability.

34. The mobile device according to claim 25, wherein said information is selected from a group consisting of:
data received from said monitoring of said at least one resource;
processed data received from said monitoring of said at least one resource;
filtered data received from said monitoring of said at least one resource; and
notification of said suspicious event.

35. The mobile device according to claim 25, wherein said diagnosing of said suspicious event is according to at least one criterion selected from a list consisting of:
predefined criterion;
predefined pattern; and
correlation analysis of data received from different ones of said at least one sensor.

36. The mobile device according to claim 35, wherein said correlation analysis is selected from a group consisting of:
analysis for predefined states;
analysis of predefined rules;
analysis of predefined relationships;
identification of patterns;
identification of common causes; and
identification of root causes.

37. The mobile device according to claim 25, wherein said fault analysis block modifies said at least one criterion according to monitored behavior of said mobile device.

38. The mobile device according to claim 25, wherein said at least one sensor provides said content relating to said suspicious event directly to said recovery block.

39. The mobile device according to claim 25, wherein said watchdog registers malfunctions of said processor that result in non-responsiveness of either one of said processor and an operating system of said mobile device.

40. The mobile device according to claim 39 wherein said security system initiates a recovery-related action in case of non-reception of a predetermined periodic signal from said processor.

41. The mobile device according to claim 25, wherein said fault analysis block employs a look-up table to determine whether said suspicious event meets said at least one criterion according to a look-up table.

42. The mobile device according to claim 39, wherein said security system continuously receives a live indication via said monitoring by said at least one sensor, of halting of said at least one resource.

43. The mobile device according to claim 25, wherein said diagnosing is initiated by a factor that is external to said mobile device.

44. The mobile device according to claim 43, wherein said factor is a user of said mobile device.

45. The mobile device according to claim 25, wherein said mobile device is a cellular phone.

46. The mobile device according to claim 32, wherein said at least one sensor invokes said fault analysis block to further analyze said suspicious event in case said at least one sensor fails to receive at least part of a test signal sent through said functional path via a respective one of said at least one sensor of said mobile device.

47. The mobile device according to claim 25, wherein said recovery block executes said at least one recovery-related action that is selected from a group consisting of:
  suspending suspected processes running on said mobile device;
  resetting of suspected modules running on said mobile device;
  loading of an operating system running on said mobile device; and
  executing a process of escalating reset of said mobile device.

48. The mobile device according to claim 25, wherein said at least one recovery-related action is selected from the group consisting of:
  rebooting said mobile device software;
  rebooting said mobile device software gradually;
  resetting at least one functional element of said mobile device;
  rebooting entire said mobile device;
  restoring a previous configuration of at least one affected said at least one resource;
  restoring of a previous configuration of all affected said at least one resource;
  restoring of previous configuration of all said at least one resource;
  reinstalling at least one application from a local source;
  reinstalling at least one application from a remote source;
  reinstalling at least one driver from a local source;
  reinstalling at least one driver from a remote source;
  reinstall at least part of an operating system of said mobile device from a local source;
  reinstalling at least part of an operating system of said mobile device from a remote source;
  reinstalling entire software of said mobile device from a local source;
  reinstalling entire software of said mobile device from a remote source;
  restoring a default configuration as set by an operator of said mobile device;
  restoring a default configuration as set by the manufacturer of said mobile device;
  restoring user data that is stored within in said mobile device; and
  restoring user data from a remote backup source.

49. The mobile device according to claim 39, further including a smart card operatively coupled with said mobile device.

50. The mobile device according to claim 49, wherein said smart card is selected from a group consisting of a subscriber identity module (SIM), a functional chip card, and a memory card.

51. The mobile device according to claim 49, wherein at least one of said at least one sensor, said recovery block, fault analysis block, and said security system is part of said smart card.

52. The mobile device according to claim 49, wherein said at least one sensor is part of said smart card, and is configured to monitor at least one resource located externally with respect to said smart card.

53. The mobile device according to claim 51, wherein said security system is part of said smart card, and monitors at least one resource located externally with respect to said smart card.

54. The mobile device according to claim 25, wherein said malware attack is selected from a group consisting of: viruses, worms, Trojan Horses, blended threats, unauthorized changes of device software configuration, potentially malicious factors, suspicious factors that intentionally compromise said mobile device, factors harmful to said mobile device and to said at least one resource.

* * * * *